US010013328B2

(12) United States Patent
Hardt et al.

(10) Patent No.: US 10,013,328 B2
(45) Date of Patent: Jul. 3, 2018

(54) INCORRECTLY CONNECTED HDMI CABLE INDICATOR

(71) Applicant: ARRIS Enterprises LLC, Suwanee, GA (US)

(72) Inventors: Charles Hardt, Lawrenceville, GA (US); John P. Eck, Dacula, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 99 days.

(21) Appl. No.: 15/134,554

(22) Filed: Apr. 21, 2016

(65) Prior Publication Data

US 2017/0308453 A1 Oct. 26, 2017

(51) Int. Cl.
| G06F 13/20 | (2006.01) |
| G06F 13/40 | (2006.01) |
| G06F 11/32 | (2006.01) |
| G06F 13/22 | (2006.01) |
| G06F 13/38 | (2006.01) |
| G06F 11/30 | (2006.01) |
| G06F 11/22 | (2006.01) |

(52) U.S. Cl.
CPC ........ *G06F 11/327* (2013.01); *G06F 11/2289* (2013.01); *G06F 11/3051* (2013.01); *G06F 13/22* (2013.01); *G06F 13/385* (2013.01); *G06F 13/4081* (2013.01)

(58) Field of Classification Search
CPC ................................. G06F 13/20; G06F 13/40
USPC .......................................................... 710/14
See application file for complete search history.

(56) References Cited

U.S. PATENT DOCUMENTS

| 8,351,747 | B1* | 1/2013 | Aybay | G02B 6/3895 |
| | | | | 385/100 |
| 9,215,491 | B1* | 12/2015 | Yeh | G06F 13/4068 |
| 2009/0138935 | A1* | 5/2009 | Ohkita | G09G 5/006 |
| | | | | 725/134 |
| 2010/0132004 | A1* | 5/2010 | Ota | G06F 13/387 |
| | | | | 725/127 |
| 2011/0283129 | A1* | 11/2011 | Guillerm | G09G 5/006 |
| | | | | 713/324 |
| 2013/0250180 | A1* | 9/2013 | Wang | H04N 5/44 |
| | | | | 348/720 |
| 2014/0205024 | A1* | 7/2014 | Toba | H04N 21/43635 |
| | | | | 375/240.28 |
| 2014/0269552 | A1 | 9/2014 | Saito | |
| 2015/0067195 | A1* | 3/2015 | Sharma | H04N 5/765 |
| | | | | 710/14 |
| 2015/0092746 | A1 | 4/2015 | Jang | |
| 2015/0189523 | A1 | 6/2015 | Michel | |

(Continued)

*Primary Examiner* — Christopher Shin
(74) *Attorney, Agent, or Firm* — Larry T. Cullen

(57) ABSTRACT

A method is provided for indicating to a user that a sink device is incorrectly connected to a High Definition Multimedia Interface (HDMI) In port. In accordance with the method, a proxy voltage is applied from an HDMI In port over an HDMI cable. The proxy voltage is sufficient to cause a hot plug event to occur. A hot plug event condition is detected at the HDMI In port from a device that is connected to the HDMI In port via the HDMI cable. Extended Display Identification Data (EDID) is read from the device at the HDMI In port over the HDMI cable. In response to receipt of the EDID, a determination is made that the device is a sink device and an error message is generated in response to the determination.

15 Claims, 6 Drawing Sheets

(56) References Cited

U.S. PATENT DOCUMENTS

| | | |
|---|---|---|
| 2015/0281017 A1 | 10/2015 | Sarkar |
| 2015/0286587 A1* | 10/2015 | Ranade ............... G06F 11/3027 710/16 |
| 2015/0358675 A1* | 12/2015 | Xu ......................... H04N 5/765 348/706 |
| 2016/0140075 A1* | 5/2016 | Kashyap ............. G06F 13/4265 710/104 |
| 2016/0142647 A1* | 5/2016 | Gopinath ............... H04N 5/765 348/706 |
| 2017/0060804 A1* | 3/2017 | Chiba ................. G06F 13/4081 |
| 2017/0195726 A1* | 7/2017 | Aggarwal ........ H04N 21/44227 |

* cited by examiner

INCORRECTLY CONNECTED HDMI CABLE INDICATOR

BACKGROUND

The High-Definition Multimedia Interface (HDMI) has become the prevalent specification for transmitting digital video and audio data from high bandwidth data sources to digital data presentation devices. HDMI sources such as DVD players, Blu-ray disc players, personal computers, video game consoles, etc., output video and audio data generated from these sources according to the HDMI specification. Digital data presentation devices capable of receiving the HDMI data are called HDMI sinks, and examples include digital televisions that may be either high-definition or non-high definition, computer monitors, laptop computers, smartphones, tablets, video game consoles and other devices.

The HDMI specification describes three separate communications channels: the Transition Minimized Differential Signaling (TMDS) channel, the Display Data Channel (DDC), and the Consumer Electronics Control (CEC) channel. The TMDS communications channel carries all audio and video data as well as auxiliary data that describes the active audio and video streams. An HDMI source device uses the DDC communications channel to determine the capabilities and characteristics of the HDMI sink device by reading the Extended Display Identification Data (EDID) data structure from the sink device. The EDID, which indicates the HDMI sink's capabilities, can include, by way of example, manufacturer name, product type, timings supported by the display, display size, luminance data and pixel mapping data. The HDMI source device reads the EDID and delivers only the audio and video formats that the HDMI sink device will support. The DDC also includes High-bandwidth Digital Content Protection (HDCP) data, which is a proprietary data stream that provides copy protection to the data supplied by an HDMI source to an authenticated HDMI sink. The CEC communications channel is optional, and provides support for higher-level user functions such as automatic setup tasks or the like.

FIG. 1 represents a system composed of a source device 1 connected to a sink device 2 through an HDMI cable 3. HDMI cable 3 contains TMDS lines for the transfer of data and control lines, serial clock (SCL) and serial data (SDA) lines and an optional CEC line for communication relating to control of the interface. The control lines SCL and SDA will henceforth be collectively referred to as the DDC (Display Data Channel) lines. The DDC connection is implemented in the HDMI specification using the "inter-integrated circuit" or I2C bus specification. An HPD (Hot Plug Detect) line serves to allow the source device 1 to detect the connection of the sink device 2. A DC line +5V is powered by source device 1 and is used by sink device 2 in order to establish reference voltage levels and to provide power to the HDMI interface circuits in the sink device 2.

SUMMARY

In one aspect, a method is provided for indicating to a user that a sink device is incorrectly connected to a High Definition Multimedia Interface (HDMI) In port. In accordance with the method, a proxy voltage is applied from an HDMI In port over an HDMI cable. The proxy voltage is sufficient to cause a hot plug event to occur. A hot plug event condition is detected at the HDMI In port from a device that is connected to the HDMI In port via the HDMI cable. Extended Display Identification Data (EDID) is read from the device at the HDMI In port over the HDMI cable. In response to receipt of the EDID, a determination is made that the device is a sink device and an error message is generated in response to the determination.

In accordance with another aspect, an intermediate device that acts as an intermediary between a source device and a sink device is provided. The intermediate device includes an HDMI Out port for receiving a first HDMI cable and an HDMI In port for receiving a second HDMI cable. The intermediate device also includes one or more processors. At least one of the processors is configured to cause the HDMI In port to switch from its normal sink mode of operation to a source mode of operation subsequent to detecting that a sink device is connected to the HDMI In port via the second HDMI cable.

DETAILED DESCRIPTION

Certain devices such as set-top boxes, Audio/Video (A/V) processors, audio amplifiers and the like act as intermediaries between a source device and a sink device. When such an intermediary device is employed, one HDMI cable is used to connect the source device to the intermediary device and the other HDMI cable is used to connect the intermediary device to the sink device. In this way, audio and video data can be transmitted from the source device to the sink device, and, when desired, the intermediary device can serve as the source of the audio and video transmitted to the sink device. The intermediary device thus acts as a relay between the source and sink devices. Such an intermediary or relay device includes both an HDMI In port for receiving an HDMI cable that is connected to a source device and an HDMI Out port that receives an HDMI cable that is connected to a sink device.

Figure 1:
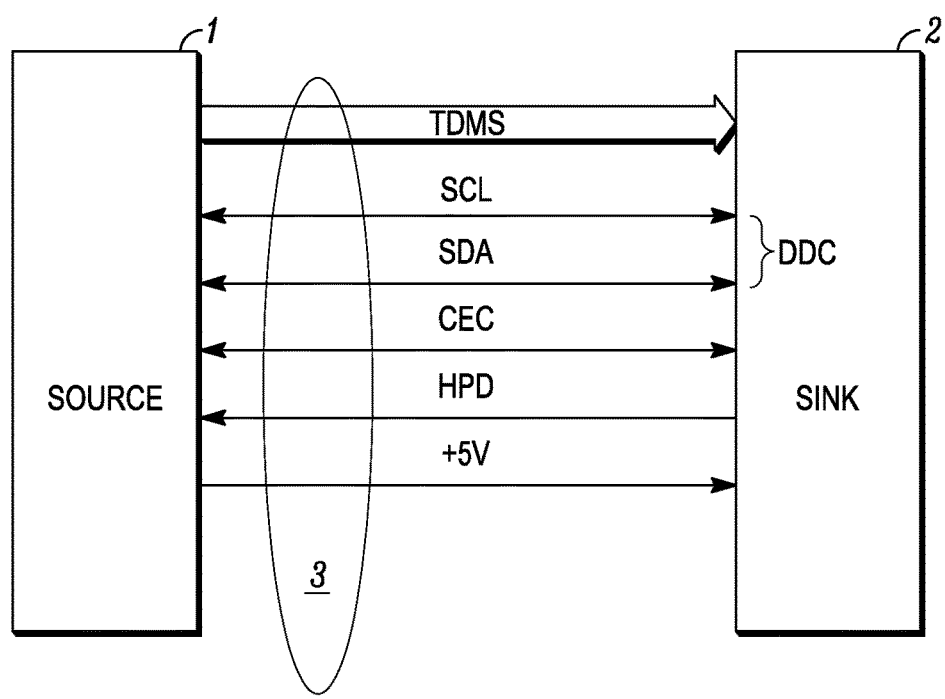
FIG. 1 shows a source device connected to a sink device through an HDMI cable.
Figure 2:
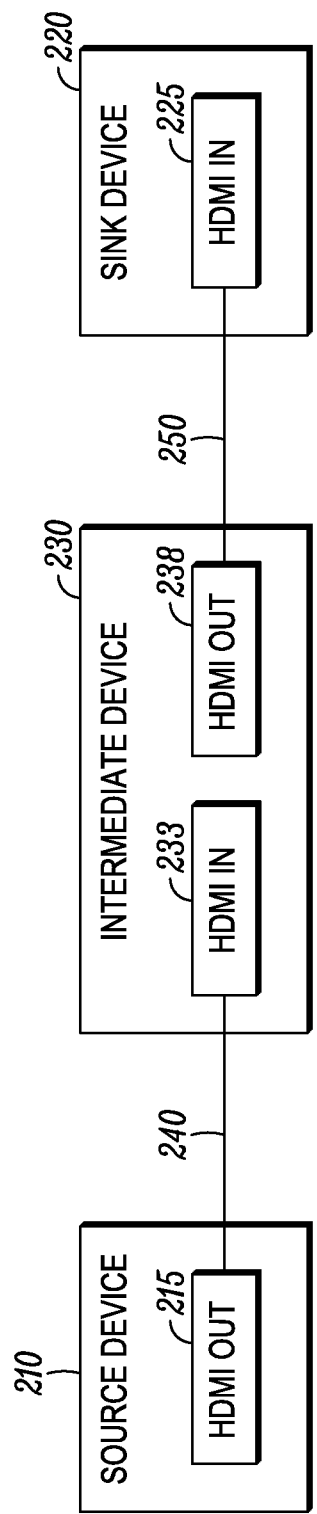
FIG. 2 shows an arrangement in which a source device communicates with a sink device via an intermediate device such as a set-top box.

FIG. 2 shows an arrangement in which a source device 210 communicates with a sink device 220 via a relay device, which is referred to herein as intermediate device 230. Source device 210 includes an HDMI Out port 215 and intermediate device 230 includes an HDMI In port 233. An HDMI cable 240 connects the HDM Out port 215 to HDMI In port 233. Intermediate device 230 also includes HDMI Out port 238 and sink device 220 includes HDMI In port 225. An HDMI cable 250 connects the HDMI Out port 238 to HDMI In port 225.

The HDMI In port and the HDMI Out port employ connectors that appear physically the same. This can cause an end user to confuse the two ports when installing a set-top or other relay. That is, the end user may inadvertently connect an HDMI cable from the source device 210 to the HDMI Out port 238 on the intermediate device 230 and an HDMI cable from the sink device 220 to an HDMI In port 233 on the intermediate device 230. Moreover, if the end user were to inadvertently plug a sink device such as a television into the HDMI In port instead of the HDMI Out port, there would be nothing to indicate to the user what was wrong. The television would simply fail to present any video and audio that is to be made available by the intermediate device.

This problem can be addressed in the manner described below. For purposes of illustration in the following examples the intermediate device will be represented as a set-top box. More generally, however, the techniques described herein may be applicable to any device such as an intermediate device that includes both an HDMI In port and HDMI Out port. These techniques will be illustrated with reference to FIG. 3, which shows a set-top box that is connected to a sink device and source device.

Figure 3:
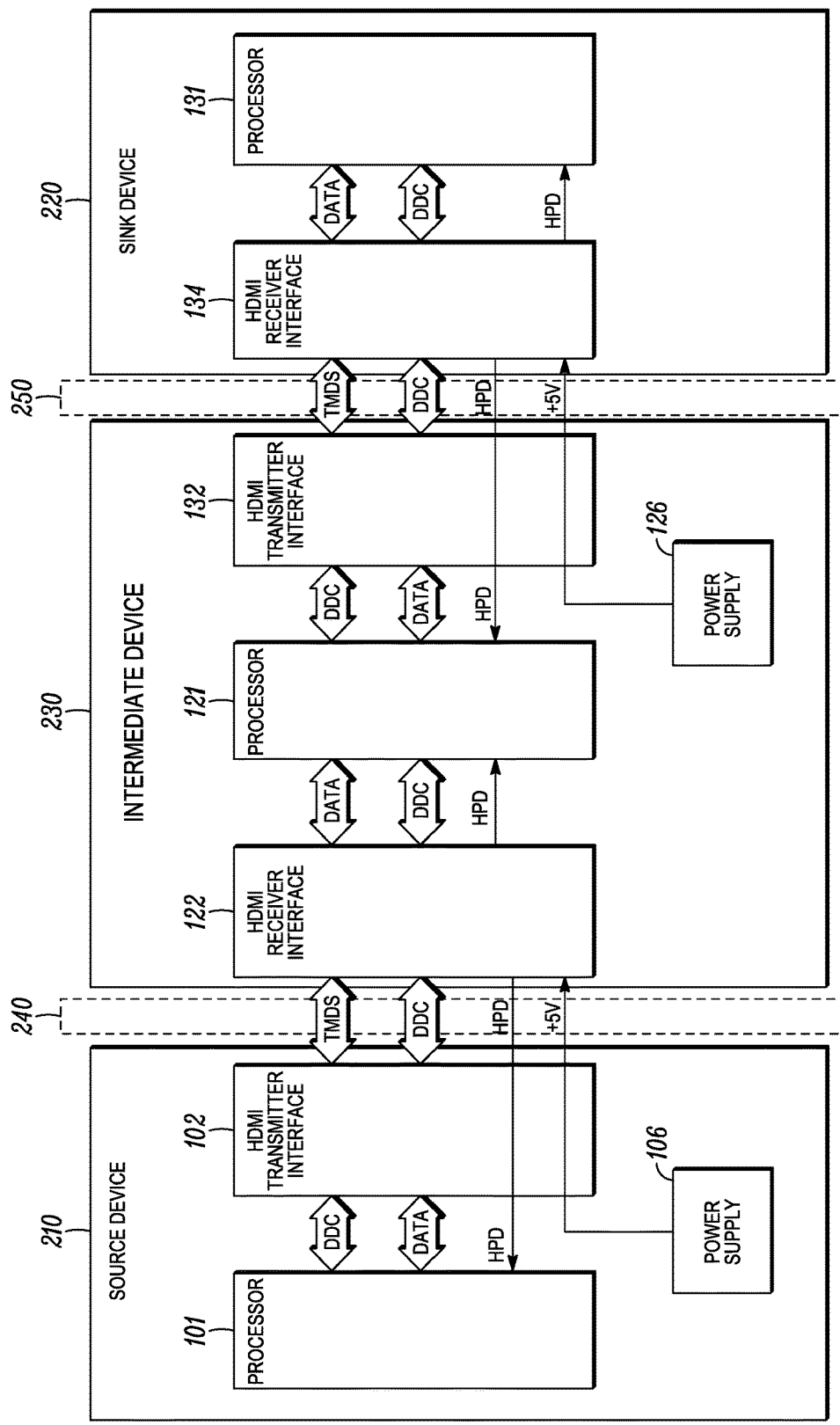
FIG. 3 shows illustrative details of one example of the HDMI In and Out interfaces employed in an arrangement similar to that shown in FIG. 2.

As shown in FIG. 3, a source device 210 includes a processor 101 that provides overall control. Processor 101 is connected via a series of data (e.g., video and audio) lines, DDC lines and a Hot Plug Detect (HPD) line to an HDMI transmitter interface circuit 102, which interfaces with the HDMI cable 240. The HDMI transmitter interface circuit 102 has an HPD input from the HDMI cable 240. Power supply 106 provides a voltage supply which may be connected, via the +5V line in HDMI cable 240, to intermediate device 230 where it may be used to power certain circuits. In one of the options specified in the HDMI standard, it is used to provide the voltage for the HPD signal.

A processor 121 provides the overall control of intermediate device 230, including, in this example, control for both HDMI In port and the HDMI Out port. On the HDMI In side, processor 121 is coupled to an HDMI receiver interface circuit 122 by a number of signal lines amongst which are lines for data, DDC and a hot-plug detect signal. On the HDMI Out side, processor 121 is coupled to an HDMI transmitter interface circuit 132 by a number of signal lines amongst which are lines for data, DDC and a hot-plug detect signal. HDMI transmitter interface circuit 132 interfaces with the HDMI cable 250. Power supply 126 provides a voltage, which may be connected via the +5 v line in HDMI cable 250, to the sink device 220, where it may be used to power certain circuits.

Sink device 220 includes a processor 131 that is coupled to an HDMI receiver interface circuit 134 by a number of signal lines amongst which are lines for data, DDC and a hot-plug detect signal. HDMI receiver interface circuit 134 interfaces with the HDMI cable 250.

When operating in accordance with the HDMI standard, source device 210 supplies five volts to the +5V line of the HDMI cable 240. Correspondingly, intermediate device 230 draws current from the +5V line of the HDMI cable 240 and when ready to connect asserts the HPD line received by the source device 210. The logic high level of the HPD received by the source device 210 indicates that a hot-plug detect condition has occurred and thus that a connection has been made through the HDMI cable 240. Likewise, the presence of the five volts causes the processor 121 in the intermediate device 230 to register that the connection through the HDMI cable 240 has been made. In response to detecting the hot-plug detect condition, source device 210 proceeds to read the EDID data from the intermediate device 230 using the DDC lines in order to obtain information about intermediate device 230.

Operation of the connection established between intermediate device 230 and sink device 220 using HDMI cable 250 is similar to that described above for the connection between the source device 210 and the intermediate device 230. In particular, intermediate device 230 supplies five volts from power supply 126 to the +5V line of the HDMI cable 250. Correspondingly, sink device 220 draws current from the +5V line of the HDMI cable 250. The presence of the five volts causes the processor 121 in the intermediate device 230 to receive a logic high level on the HPD line, which indicates that a hot-plug detect condition has occurred and thus that a connection has been made through the HDMI cable 250. Likewise, the presence of the five volts causes the processor 131 in the sink device 220 to register that the connection through the HDMI cable 250 has been made. In response to detecting the hot-plug detect condition, intermediate device 230 proceeds to read the EDID data from the sink device 220 using the DDC lines in order to obtain information about sink device 220.

Figure 4:
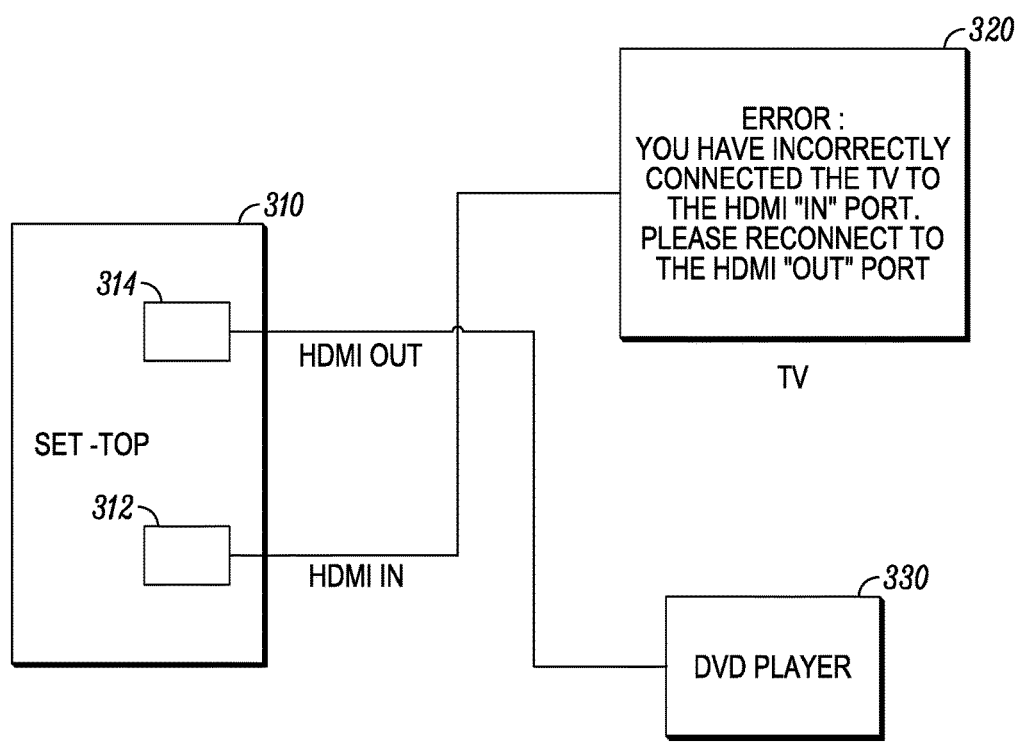
FIG. 4 shows an error message that is generated on the display of a sink device that is incorrectly connected to HDMI In port of an intermediate device such as a set-top box.

In accordance with the subject matter of the present disclosure, if, as illustrated in FIG. 4, an end user inadvertently connects a sink device 320 such as a television or other display to the HDMI In port 312 of a set-top box 310 (or other device), the set-top box 310 would, upon detection, switch from its normal sink mode of operation to a source mode of operation. When operating in its source mode, the HDMI In port 312 outputs an error message that is delivered to the television. As shown in FIG. 4, the output message may inform the user that the television has been incorrectly connected to the HDMI In port 312 and request the user to reconnect it to the HDMI Out port. In addition, or in the alternative, if the set-top box 310 has an LED/LCD alphanumeric display an error message also may be displayed, indicating an HDMI failure. Alternatively, if the set-top box 310 does not have an LED/LCD alphanumeric display, but instead has one or more status LEDS, an error blink condition can be initiated.

In the example of FIG. 4 the source device 330 is represented as being a DVD player. Of course, since the sink device 320 is incorrectly connected to the set-top box 310, the source device 330 is also incorrectly connected to the set-top box 310. Specifically, the source device 330 will be incorrectly connected to the HDMI Out port 314 instead of the HDMI In port 312. The error message presented on the television or other sink device 320 may expressly instruct the user to reconnect it to the HDMI In port. Alternatively, the need to perform this task may be left implicit as part of the instructions to reconnect the sink device 320 to the HDMI Out port 314.

In order for the set-top box to present the error message when the sink device is incorrectly connected to the HDMI In port of the set-top box, the set-top box will first need to detect a hot plug detect condition to recognize that a connection has been established through an HDMI cable and that the EDID should be read from the sink device. However, as explained above in connection with FIG. 3, if the sink device 220 is connected to the HDMI In port of the set-top box 230, a +5V source will not be available to generate a hot plug detect condition and thus the set-top box 230 will not monitor the HDMI In port for a hot plug event. Without the ability to detect a hot plug detect condition and subsequently exchange EDID information over the HDMI connection, the television or other sink device 220 will continue to display a blank screen.

In order to allow the HDMI In port on the set-top box to detect a hot plug detect condition the HDMI In port may be configured to provide its own +5 v source, referred to herein as a proxy +5 v source, so that any inadvertently connected sink device will produce a hot plug detect condition and make its EDID buffer available to the set-top box. In one particular implementation, the processor in or associated with the HDMI In port of the set-top box may periodically (e.g., once a second) poll for the presence of +5 v from a real source device that is correctly connected to the HDMI In port. The proxy +5 v will be supplied if this +5 v is not detected by the HDMI In port.

If the proxy +5V is being applied and a hot plug detect condition is detected, the HDMI In port can then attempt to read (and, optionally, validate) the EDID from the sink device over the DDC line. If the set-top box is able to read the EDID on its HDMI In port, it will be known that a sink device is incorrectly connected to its HDMI input connector. In response the set-top box will switch from its normal sink mode of operation to its source mode of operation in which it outputs an error message that is delivered to the sink device.

Figure 5:
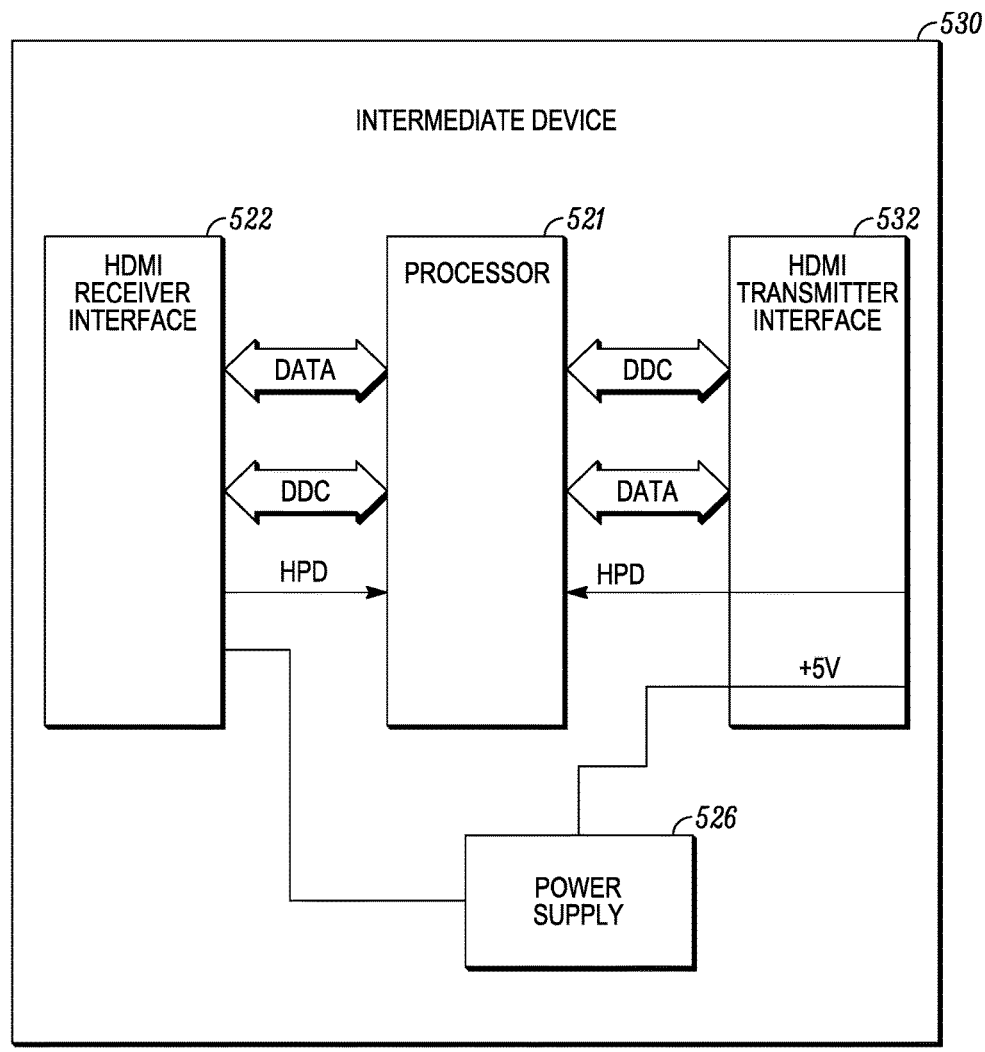
FIG. 5 shows one example of an intermediate device such as a set-top box that includes an HDMI In port that is configured to generate an error message such as shown in FIG. 4 when it is incorrectly connected to a sink device.

FIG. 5 shows one example of an intermediate device 530 such as a set-top box that includes an HDMI In port that is configured to generate an error message when it is incorrectly connected to a sink device. As shown, a processor 521 provides the overall control of intermediate device 530, including, in this example, control for both the HDMI In port and the HDMI Out port. On the HDMI In side, processor 521 is coupled to an HDMI receiver interface circuit 522 by a number of signal lines amongst which are lines for data, DDC and a hot-plug detect signal. Power supply 526 provides the proxy voltage to the improperly connected sink device, which allows the sink device to provide a hot plug detect condition to the intermediate device 530, indicating that a hot-plug detect condition has occurred and thus that a connection has been made through an HDMI cable. In response to receipt of the hot plug detect condition, the processor 521 can attempt to read out the EDID from the sink device and thereby determine that a sink device is improperly connected. On the HDMI Out side, processor 521 is coupled to an HDMI transmitter interface circuit 532 by a number of signal lines amongst which are lines for data, DDC and a hot-plug detect signal. Power supply 526 also provides the voltage that causes the processor 521 in the intermediate device 530 to receive a logic high level on the HPD line, which indicates that a hot-plug detect condition has occurred and thus that a connection has been made through an HDMI cable.

If the intermediate device 530 cannot read out the EDID from the sink device after some specified number of attempts, in some embodiments the intermediate device 530 may return to its polling state where it periodically polls for the presence of +5V from a source device and applies the proxy voltage if the +5V is not detected.

Once it has been determined that a sink device is improperly connected to the HDMI In port of the set-top box, the end user may be alerted using one or more of the techniques described above. That is, an error message may be presented on the sink device and/or indicators on the set-top box may indicate that an error has occurred. For example, in the latter case an LED/LCD display on the set-top box may indicate that an error has occurred. As another example, a status LED on the set-top box may alternately turn on and off in a certain pattern (e.g. blinking on an off every 0.5 seconds). The set-top box may continue to alert the user until the hot plug detect condition terminates, at which point the error message is removed and the HDMI In port removes the +5V proxy. The HDMI In port then returns to its normal operation in which, in one implementation, it monitors or polls for an incorrectly connected sink device.

In one implementation, in order to generate an error message that is transmitted from the HDMI In port to the sink device for display on the sink device, the HDMI receiver interface is converted for operation as an HDMI transmitter interface. If the hardware allows it, this can be accomplished by replacing the HDMI In software stack in the HDMI receiver interface with the HDMI Out software stack. The HDMI In port may continue to operate in this manner until the hot plug detect condition from the improperly connected sink device goes away for some period of time, at which point the HDMI Out software stack is brought down and replaced with the HDMI In software stack so that the HDMI In port reverts back to its normal operation while continuing to poll for an improperly connected sink device.

In some cases an end user may inadvertently connect two sink devices (e.g., two televisions or one television and a computer display) to the set-top box, one to the HDMI In port and the other to the HDMI Out port. In this case, in one implementation the error message may be sent to the sink device properly connected to the HDMI Out port instructing the user to disconnect the sink device connected to the HDMI In port. In this implementation an error message may or may not also be sent to the improperly connected sink device by the HDMI In port in the manner described above.

Figure 6:
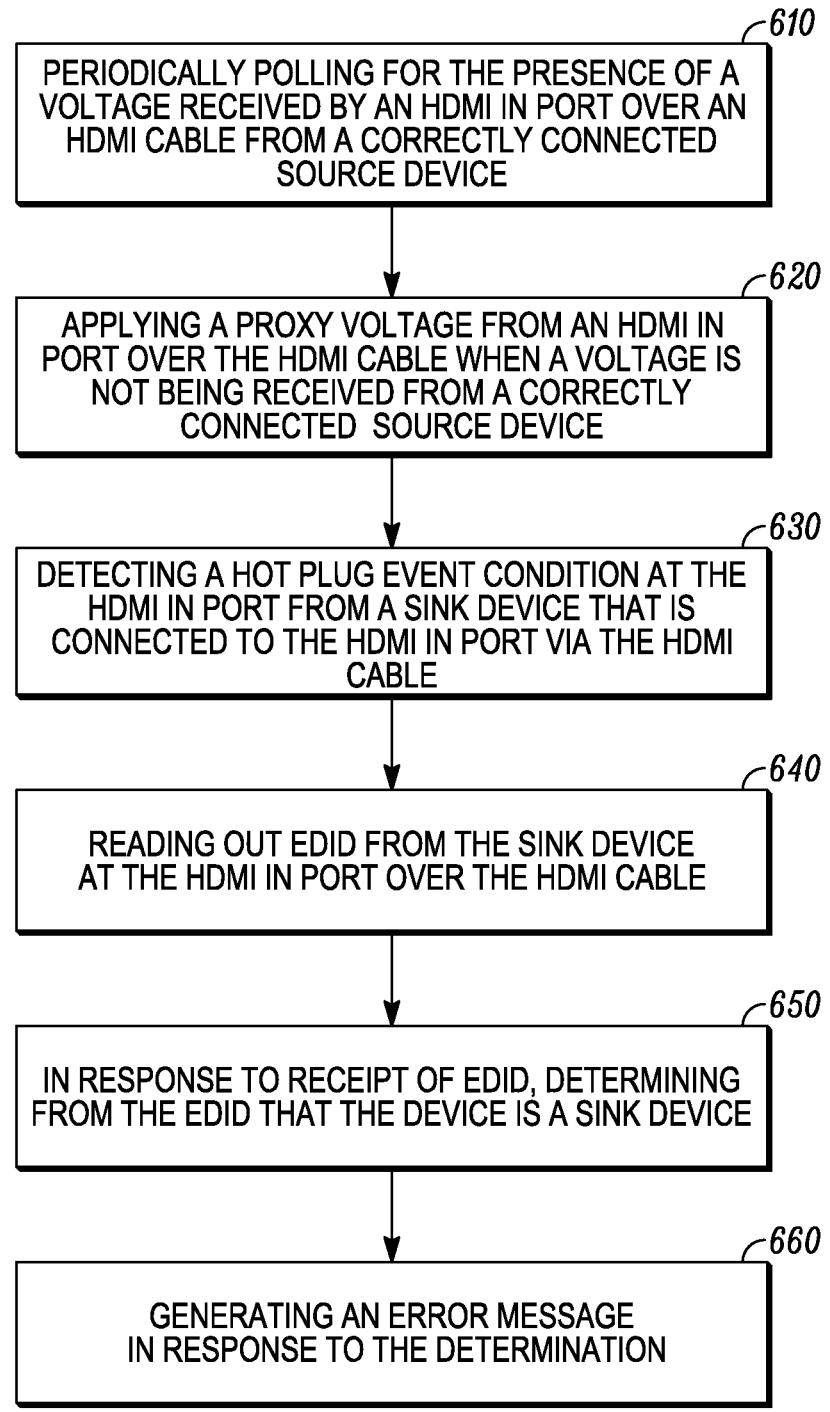
FIG. 6 is a flowchart showing one example of a method for indicating to a user that a sink device is incorrectly connected to an HDMI In port.

FIG. 6 is a flowchart showing one example of a method for indicating to a user that a sink device is incorrectly connected to an HDMI In port. The method begins at block 610, where an HDMI In port periodically polls for the presence of a voltage being received over an HDMI cable from a correctly connected source device. At block 620 a proxy voltage is applied from an HDMI In port over the HDMI cable whenever a voltage is not being received from a correctly connected source device. At a subsequent time, a hot plug detect condition is detected at the HDMI In port at block 630 from a sink device that is connected to the HDMI In port via the HDMI cable. At block 640, EDID is read out by the HDMI In port from the sink device over the HDMI cable. In response to receipt of the EDID, the HDMI In port determines that the device is a sink device at block 650. In response to the determination, the HDMI In port generates an error message at block 660 that is communicated to the user, possibly by presenting an error message on the display of the sink device.

Several aspects of an intermediate device will now be presented with reference to various apparatus and methods described in the foregoing detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionalities described throughout this disclosure. One or more processors in the processing system may execute software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on non-transitory computer-readable media. Non-transitory computer-readable media may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable non-transient media for storing or transmitting software. The computer-readable media may be resident in the processing system, external to the processing system, or distributed across multiple entities including the processing system. Computer-readable media may be embodied in a computer-program product. By way of example, a computer-program product may include one or more computer-readable media in packaging materials. Those skilled in the art will recognize how best to implement the described functionality presented throughout this disclosure depending on the particular application and the overall design constraints imposed on the overall system.

Variations of the above described systems and methods will be understood to one of ordinary skill in the art given this teaching.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for indicating to a user that an external device is incorrectly connected to a High Definition Multimedia Interface (HDMI) In port which is configured as a sink device within a first device, the first device also including an HDMI Out port, comprising:
  applying a proxy voltage from the HDMI In port over an HDMI cable connected between the external device and the HDMI In port of the first device, the proxy voltage being sufficient to cause a hot plug event to occur;
  detecting a hot plug event condition at the HDMI In port received from the external device via the HDMI cable;
  reading Extended Display Identification Data (EDID) received from the external device at the HDMI In port over the HDMI cable;
  in response to receipt of the EDID, determining that the external device is an external sink device configured to receive content from the HDMI cable; and
  generating an error message which indicates that the HDMI cable is connected between the HDMI In port of the first device and the external sink device in response to the determination.

2. The method of claim 1, wherein applying the proxy voltage from the HDMI In port is only performed when the HDMI In port does not detect a first voltage being received over the HDMI cable.

3. The method of claim 2, further comprising periodically polling for the presence of the first voltage.

4. The method of claim 1, wherein generating the error message includes transmitting the error message over the HDMI cable for presentation on a display of the external sink device.

5. The method of claim 4, wherein the message instructs a user to connect the external sink device to the HDMI Out port of the first device.

6. The method of claim 1, wherein generating the error message includes generating the error message on an intermediate device in which the HDMI In port is incorporated.

7. The method of claim 6, wherein the intermediate device includes a HDMI Out port and the error message further indicates that the sink device is to be connected to the HDMI Out port.

8. The method of claim 6, wherein the error message includes a status indicator that blinks to indicate an error.

9. The method of claim 1, wherein the HDMI In port is incorporated into an intermediate device that also includes an HDMI Out port.

10. An intermediate device that acts as an intermediary between a first device and an external device, comprising:
  an HDMI Out port for receiving a first HDMI cable, the HDMI Out port being configured to operate as a source device for providing content through the HDMI cable;
  an HDMI In port for receiving a second HDMI cable, the HDMI In port being configured to operate as a sink device for receiving content through the HDMI cable;
  one or more processors, at least one of the processors being configured to cause the HDMI In port to perform the operations of:
  applying a proxy voltage from the HDMI In port over an HDMI cable connected between the external device and the HDMI In port of the first device, the proxy voltage being sufficient to cause a hot plug event to occur;
  detecting a hot plug event condition at the HDMI In port received from the external device via the HDMI cable;
  reading Extended Display Identification Data (EDID) received from the external device at the HDMI In port over the HDMI cable;
  in response to receipt of the EDID, determining that the external device is an external sink device configured to receive content from the HDMI cable; and
  generating an error message which indicates that the HDMI cable is connected between the HDMI In port of the first device and the external sink device in response to the determination;
  reconfiguring the HDMI In port to operate as a source device and transmit the error message to the external device via the second HDMI cable.

11. The intermediate device of claim 10, wherein the HDMI In port includes a HDMI interface that includes a HDMI receiver software stack and wherein the at least one processor is further configured to cause the HDMI receiver software stack to be replaced with a HDMI transmitter software stack to cause the HDMI In port to switch from its normal sink mode of operation to the source mode of operation.

12. The intermediate device of claim 10, wherein the at least one processor is further configured to cause the proxy voltage to only be applied when the HDMI In port does not detect a first voltage being received over the second HDMI cable.

13. The intermediate device of claim 12, further comprising periodically polling for the presence of the first voltage.

14. The intermediate device of claim 10, wherein the error message is transmitted over the second HDMI cable for presentation on a display of the external device.

15. The intermediate device of claim 14, wherein the error message instructs a user to connect the external device to an HDMI out port.

* * * * *